Sept. 14, 1965

H. P. RAABE 3,206,142

SELF-STABILIZING SATELLITE

Filed June 3, 1963

INVENTOR.
HERBERT P. RAABE

BY
*Stuart R. Peterson*
ATTORNEY 3,206,142
SELF-STABILIZING SATELLITE
Herbert P. Raabe, St. Paul, Minn., assignor, by mesne assignments, to Litton Systems, Inc., Beverly Hills, Calif., a corporation of Maryland
Filed June 3, 1963, Ser. No. 284,976
9 Claims. (Cl. 244—1)

This invention relates generally to satellites, and pertains more particularly to a self-stabilizing satellite.

At the outset, it will be helpful to understand that it is often required that a satellite be stabilized in such a way that one body axis points toward the center of the celestial main body, for example the earth, while some orthogonal axis points in the direction of the orbital plane or normal to it. Examples of such satellites are ground reconnaissance and communication satellites. If active stabilization devices are used, such as infrared horizon sensors, star trackers, rockets and power supplies, the initial cost is very high and the lifetime seriously limited. Two years constitute a very good lifetime. However, lifetimes of ten times as much are to be desired in a number of instances. If a satellite could be shaped in such a way that it orients itself with respect to two preferably orthogonal directions and stabilizes itself in this attitude, a stabilization lifetime could be achieved which would be determined by the integrity of the entire structure.

Stabilization of one body axis of a satellite with respect to the center of gravity, assuming a circular orbit, can be achieved by a dumbbell configuration. If such a configuration orbits at an arbitrary attitude, the mass nearer the earth finds more gravitational pull than the mass on the far side, while the centrifugal force is stronger on the far side than on the near side. Consequently, a stretching force will act to line the two masses up in a radial direction with respect to the earth. Once placed in this attitude, the dumbbell will remain in this attitude indefinitely. If the attitude is disturbed, or if the satellite is initially placed in orbit at the arbitrary attitude, librations around the stable attitude will result, but these librations may be absorbed by a special damping device so that the stable attitude will be restored or achieved. Such a damping device has been described in my co-pending patent application, Serial No. 247,925, filed December 28, 1962, titled "Gravity Stabilized Satellite."

While the foregoing principle has dealt with the stabilization using gravitational force and also centrifugal force, a second principle involves stabilization of an attitude by reason of the gyroscopic effect. This means that a satellite, spinning about the axis of maximum moment of inertia, will maintain rotation indefinitely due to absence of friction and the axis will maintain its attitude with respect to the inertial space at a high precision, even under the influence of minor disturbing forces. However, in contrast to the gravity effect, the axis of orientation is in no way distinguished. Therefore, given enough time, disturbing forces can tilt the axis of rotation gradually, and there is no tendency for a gyro to return to its initial attitude.

The principal object of the present invention is to combine the gravity and the gyroscopic effects with the result that the satellite will find only one stable attitude, namely, the orientation normal to the orbital plane, so that full and indefinite stabilization with respect to the earth can be achieved. The invention has for a specific aim the accomplishment of the foregoing object without the need for mechanically moving parts. The invention also has for a further object the provision of a self-stabilizing satellite that can be produced at a relatively low cost and which can be readily placed in a desired orbit by virtue of its simplicity.

These and other objects and advantages of my invention will more fully appear from the following description, made in connection with the accompanying drawing, wherein like reference characters refer to the same or similar parts througout the several views and in which.

Figure 1:
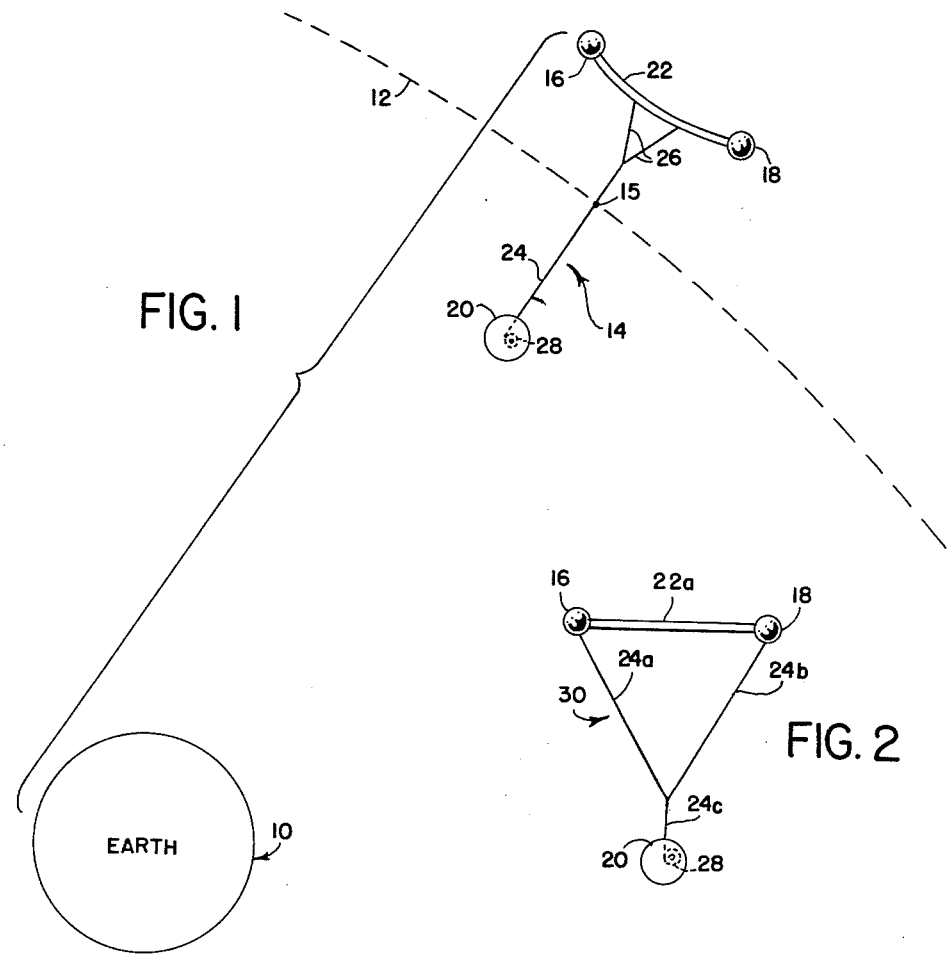
FIGURE 1 is a view showing one form my self-stabilizing satellite may assume, the satellite being shown in orbit about the earth.

Referring now to FIGURE 1, the earth has been denoted by the reference numeral 10 and the orbital path by the numeral 12. The self-stabilizing satellite shown in FIGURE 1 has been generally designated by the reference numeral 14 and has its center of mass at 15. The structure 14 includes a pair of bodies having substantially equal masses 16 and 18 and a third body 20. The bodies 16, 18 are maintained in a separated or spaced relationship with each other through the agency of a rod or bar 22. The rod or bar 22 constitutes an elongated member that is somewhat flexible in the present situation so as to bend or curve into the bowed condition depicted in this particular figure when the bodies 16, 18 are subjected to sufficient centrifugal force. The body 20 has preferably the same mass as the combined mass of the bodies 16, 18 and the elongated member 22. When in orbit, the body 20 is permitted to assume a separated or spaced relationship with the bodies 16 and 18 by virtue of a wire element 24 which is connected to an intermediate portion of the member 22 via a harness or bridle composed of two angularly directed wires 26. The other end of the wire element 24 from the harness wires 26 is connected to the body 20. The wire element 24 has a length such that the spacing of the body 20 from the bodies 16, 18 is greater than the distance between the bodies 16, 18. My co-pending patent application for "Gravity Stabilized Satellite" has already been mentioned, and at this point it can be explained that the damping device shown therein has been identified by the reference numeral 28 in the present drawing and includes a spring actuated take-up reel for the wire element 24 and associated energy dissipating means, such as an eddy current brake. The manner in which the device 28 functions can be readily understood from only a brief reference to my copending application. However, it can be pointed out that the attachment of the wire element 24 to the device 28 effects the connection of the wire element 24 to the body 20.

Figure 2:
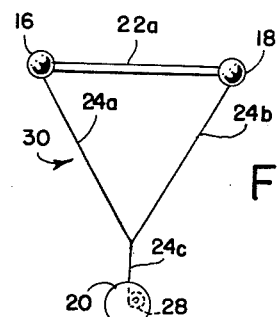
FIGURE 2 is another satellite structure embodying the concepts of the instant invention.
Figure 3:
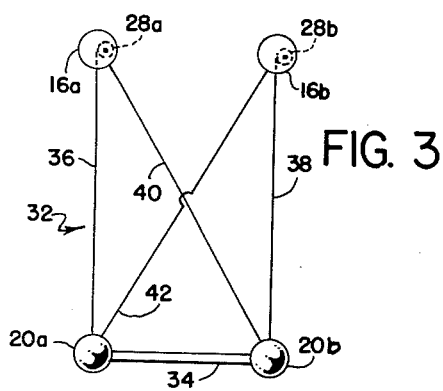
FIGURE 3 is still another view showing a different embodiment.
Figure 4:
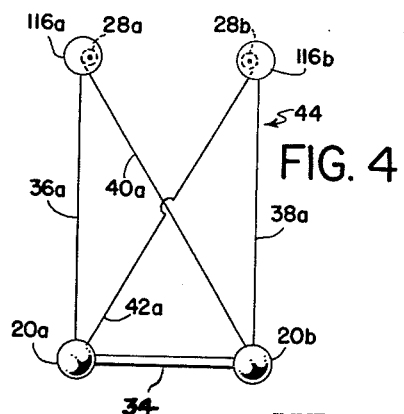
FIGURE 4 is an embodiment of the invention closely resembling the embodiment of FIGURE 3.

Before proceeding with the descriptions of the embodiments shown in FIGURES 2-4, it will be of benefit to describe briefly the manner in which the satellite 14 functions. Because of the greater distance between the body 20 and the combined bodies 16, 18 than the distance between the individual bodies 16 and 18, it follows that the satellite 14 will assume either the attitude illustrated in FIGURE 1 or an attitude where the positions of the body 20 and the combined bodies 16, 18 are interchanged.

Only a word is necessary with respect to the operation of the device 28. From my co-pending patent application, it is obvious that this device is intended to dampen any librations, both those arising during the deployment of the satellite and also those arising while the satellite is traversing its orbital path.

It will be recalled that the invention involves a combination of the gravity and gyroscopic effects. Having mentioned the gravity effect with respect to the operation of the invention, it can now be understood that the gravity gradient stabilized satellite 14 is forced to rotate about an axis normal to the plane of the orbit 12 at a rate of one revolution per orbital period. However, a freely suspended rotating body is subjected to gyroscopic forces and these forces tend to tilt the axis of the maximum moment of inertia in alignment with the axis of rotation. This tilting force causes the satellite to precess and as an effect of this precession, the gravity stabilization will be disturbed, resulting in librations of the satellite 14 about its center of mass 15. As discussed in my co-pending patent application, hereinbefore mentioned, energy of the librations will be absorbed in the damping device 28 so that the damping device is indirectly capable of absorbing the energy of the precession and the satellite 14 will gradually assume a stabilized attitude whereby the axis of the minimum moment of inertia is directed toward the center of the earth 10 and the axis of the maximum moment of inertia will be perpendicular to the plane of the orbit 12.

The gyroscopic torque which moves the two bodies 16 and 18 into the plane of the orbit 12 is compartively weak and any means to increase this force is very desirable. Owing to the flexibility of the elongated member 22, such an increase can be realized. For the sake of a simplified explanation, let it be assumed that the body 20 is of much larger mass than the combined masses of the bodies 16 and 18 so that a flexure of member 22 will affect the orbit of the bodies 16 and 18 only. If these two bodies were initially positioned in such a way that the elongated member 22 is normal to the orbital plane, the gravity force would be determined by the slanting distance between the bodies 16, 18 and the center of the earth 10 while the centrifugal force would be determined by the shorter distance of these bodies to the axis of the orbital plane. If the two bodies 16 and 18, however, are positioned in the plane of the orbit, the distances of the bodies from the center of the earth and to the axis of the orbit 12 are the same. Hence, the centrifugal force must be somewhat stronger in this position, leading to a stronger flexure of the elongated member 22 and consequently to a still greater excess of the stabilizing centrifugal force over the gravitational force. The fact that the body 20 is actually of about the same mass as the combined mass of the bodies 16 and 18 does not upset the mechanism leading to the increased stabilizing force. It will only lead to a situation whereby the body 20 moves closer to the earth 10 and the orbit of the center of gravity 15 of the entire satellite 14 remains undisturbed.

Owing to the flexibility of the elongated member 22 in the satellite 14, it follows that a stronger stabilizing force is brought about because the bodies 16, 18 move farther away from the earth which is permitted by the bowing that takes place. In FIGURE 2, though, the satellite labeled 30 does not have a flexible elongated member, but instead has a rigid rod or elongated member which has been identified by the reference numeral 22a. Hence, with the satellite 30, the elongated member 22a remains rigid. The rigidity of the member 22a permits the attachment of two wire elements 24a, 24b directly to the smaller masses 16 and 18. The other ends of the wire elements 24a, 24b are joined to a wire element 24c which is connected to the damping device 28.

Other than that the stabilization due to the gyroscopic effect is not quite as pronounced in the embodiment labeled 30, this being because the elongated member 22a does not flex and the bodies do not move farther out to increase the centrifugal force, the functioning or operation is vertually the same as that of the satellite 14. Accordingly, it is not believed necessary to repeat the operation sequence previously given.

A somewhat different satellite configuration is illustrated in FIGURE 3. This satellite has been generally denoted by the reference numeral 32. This embodiment involves the use of four bodies. More particularly, two bodies 16a, 16b are employed which correspond generally to the bodies 16 and 18, previously mentioned. Instead of a single body 20, though, two bodies 20a, 20b are utilized. Unlike the embodiment of FIGURES 1 and 2, however, the bodies 16a and 16b are not held in a spaced relationship by an elongated member. Instead, the bodies 20a, 20b are maintained in a spaced relation by reason of a rigid rod or elongated member 34, and the combined mass of the bodies 20a, 20b and member 34 is preferably equal to the combined mass of the bodies 16a, 16b.

A crossed wire arrangement is used for connecting the bodies 16a, 16b to the bodies 20a, 20b. In this regard, it will be observed that two generally parallel wire elements 36 and 38 have their ends connected between the bodies 16a, 16b and the bodies 20a, 20b. In this particular embodiment, the ends of the wire elements 36, 38 connected to the bodies 16a, 16b are actually attached to damping devices 28a and 28b, these being identical to the damping device 28. Still further, additional wire elements 40, 42 are utilized, these elements crossing each other as is clearly evident from FIGURE 3. The ends of the wire elements 40, 42 are secured to the bodies 16a, 16b in one instance and the bodies 20a, 20b in the other.

With respect to the operation of the satellite 32, it will be understood that the two bodies 16a, 16b can assume a spaced relationship depending upon the centrifugal force acting on these bodies. The wire elements 40, 42 merely swing through the necessary arc to permit this to occur, while the damping devices 28a, 28b act to take up or pay out the wire elements 36, 38 as needed. As with the satellites 14 and 30, the satellite 32 embodies therein the combined gravitational and gyroscopic effects that have been previously mentioned.

The embodiment of FIGURE 4 is very close to that of FIGURE 3. The embodiment of FIGURE 4 has been identified generally by the reference numeral 44 and utilizes the same rigid rod or elongated bar 34 extending between the bodies 20a, 20b. In order to stress the fact that the damping devices 28a, 28b are connected to different wire elements in this situation, the wire elements have all been distinguished by the suffix "a." Likewise, the bodies carrying the damping devices 28a, 28b have have distinguished by terming them 116a and 116b, respectively. As with the embodiment labeled 32, it is preferable that the combined mass of the bodies 20a, 20b and the member 34 equal approximately the combined mass of the bodies 116a and 116b.

Thus, the satellite 44 involves the swinging of the bodies 116a, 116b about the bodies 20a, 20b by reason of the securement of the ends of the wire elements 36a, 38a to these bodies. As the swinging takes places, any librations are absorbed by the damping devices 28a, 28b due to the connections therewith of the crossed wire elements 40a, 42a.

It will, of course, be understood that various changes may be made in the form, details, arrangements and proportions of the parts without departing from the scope of my invention as set forth in the appended claims.

What is claimed is:

1. A satellite for orbiting around a celestial body in an orbital plane, during said orbiting said satellite being responsive to centrifugal, gravitational and gyroscopic forces for self-stabilization relative to first and second perpendicular axes positioned in said orbital plane, which comprises:

a first pair of bodies having substantially equal masses; an elongated member extending between said bodies to maintain said bodies spaced by a selected distance;
a second pair of bodies having substantially equal masses, said equal masses of said second pair of bodies being substantially equal to said equal masses of said first pair of bodies, said centrifugal and gravitational forces being effective to bias said first and second pairs of bodies apart;
a first pair of wire elements crossing each other and having their ends connected to said first and second pairs of bodies;

a second pair of wire elements also having their ends connected to said first and second pairs of bodies and extending generally parallel to each other;

said first and second pair of wire elements being effective to resist said bias on said first and second pairs of bodies to maintain said first pair of bodies spaced from said second pair of bodies by a predetermined distance, said predetermined distance exceeding said selected distance;

said gyroscopic force being effective to rotate said first pair of bodies into said orbital plane for alignment with said second axis, said rotation being effective to vary said bias resisted by said first and second pairs of wire elements; and means secured to the wire elements of one of said first and second pairs of wire elements for damping said variations in said bias to stabilize said satellite relative to said first and second axes.

2. A self-stabilizing satellite in accordance with claim 1 including:

said damping means including a damping device carried by each one of said second pair of bodies.

3. A self-stabilizing satellite in accordance with claim 2 in which:

said second pair of wire elements have one end connected to said damping devices.

4. A self-stabilizing satellite in accordance with claim 2 in which:

said first pair of wire elements have one end connected to said damping devices.

5. A satellite for orbiting around a celestial body in an orbital plane, during said orbiting said satellite being responsive to centrifugal, gravitational and gyroscopic forces for self-stabilization relative to first and second perpendicular axes positioned in said orbital plane, which comprises:

first and second body means biased apart by said centrifugal and gravitational forces, at least one of said first and second body means including first and second bodies spaced apart by substantially a selected distance;

wire-like means resisting said biasing of said first and second body means for maintaining said first and second body means spaced substantially a predetermined distance apart along a given axis of minimum moment of inertia with said given axis coinciding with said first axis, said predetermined distance exceeding said selected distance;

means for maintaining said first and second bodies spaced apart by substantially said selected distance so that said first and second bodies define a selected axis of maximum moment of inertia, said gyroscopic force being effective to move said selected axis and to rotate said first and second bodies into said orbital plane for alignment with said second axis, said rotation of said first and second bodies being effective to vary said bias resisted by said wire-like means; and means responsive to said variation of said bias resisted by said wire-like means for damping said variation so that said satellite is stabilized relative to said first and second axes.

6. A satellite in accordance with claim 5 in which:

said maintaining means is flexible, said maintaining means being flexed upon rotation of said first and second bodies into said orbital plane to provide additional stabilization of said satellite relative to said first and second axes.

7. A satellite in accordance with claim 5, in which:

said first and second bodies experience increased centrifugal forces upon rotation thereof into said orbital plane; and said maintaining means is bowed by said increased centrifugal forces on said first and second bodies for stabilizing said first and second bodies in alignment with said second axis.

8. A satellite in accordance with claim 5, in which:

said maintaining means is provided with opposite ends secured to opposite ones of said first and second bodies, said maintaining means being flexible;

said wire-like means being secured to said maintaining means; and said first and second bodies experience increased centrifugal forces upon rotation thereof into said orbital plane, said increased centrifugal forces being effective to cause said first and second bodies to flex said maintaining means for providing increased stabilization of said satellite relative to said first and second axes.

9. A satellite in accordance with claim 5 in which:

said wire-like means includes first and second wire elements secured to said respective first and second bodies, said wire-like means further including a third wire element joined to said first and second wire elements; and said damping means being mounted on said first body means and connected to said third wire element for response to said variations of said bias resisted by said wire-like means.

References Cited by the Examiner

UNITED STATES PATENTS 3,030,049 4/62 Pilkington _____ 244—1
3,031,154 4/62 Roberson _____ 244—1

OTHER REFERENCES

Space, Aeronautics Magazine, February 1963, pages 82 and 83.

ARS Journal, December 1959, pages 927–929.

FERGUS S. MIDDLETON, *Primary Examiner.*

RALPH D. BLAKESLEE, *Examiner.*